United States Patent [19]

Kamel et al.

[11] Patent Number: 5,284,509
[45] Date of Patent: Feb. 8, 1994

[54] METHOD FOR PRODUCING SUPERIOR QUALITY PAVING ASPHALT AND PRODUCT PREPARED THEREFROM

[75] Inventors: Nabil I. Kamel, Mississauga; Laverne J. Miller, Georgetown, both of Canada

[73] Assignee: Petro-Canada Inc., Mississauga, Canada

[21] Appl. No.: 870,164

[22] Filed: Apr. 15, 1992

Related U.S. Application Data

[63] Continuation of Ser. No. 530,531, May 30, 1990, abandoned.

[51] Int. Cl.$^5$ .................. C09D 195/00; C08L 95/00
[52] U.S. Cl. .......................... 106/273.1; 106/284.1; 106/284.2
[58] Field of Search ............... 106/284.1, 284.2, 273.1

[56] References Cited

U.S. PATENT DOCUMENTS

| | | | |
|---|---|---|---|
| 1,782,186 | 11/1930 | Abson . | |
| 2,450,756 | 9/1948 | Hoiberg . | |
| 2,649,384 | 8/1953 | Anderson . | |
| 3,986,887 | 10/1976 | Pitchford . | |
| 4,328,147 | 5/1982 | Chang et al. | 106/279 |
| 4,338,137 | 7/1982 | Goodrich . | |
| 4,456,523 | 6/1984 | Carlos et al. . | |
| 4,456,524 | 6/1984 | Wombles et al. . | |
| 4,975,176 | 12/1990 | Begliardi et al. | 106/273.1 |
| 5,098,480 | 3/1992 | McGinnis et al. | 106/273.1 |

FOREIGN PATENT DOCUMENTS

| | | |
|---|---|---|
| 177721 | 3/1979 | Czechoslovakia . |
| 0053041 | 6/1982 | European Pat. Off. . |
| 1963489 | 2/1972 | Fed. Rep. of Germany . |
| 1559083 | 1/1980 | United Kingdom . |

OTHER PUBLICATIONS

*The Use of Blown Bitumen in Asphalt Road Construction.*
Ball, J. S. and Singh Himmat; *Air Blowing of Bitumens; Process Variables and Structural Parameters;* Rev. Inst. Fr. Pet., 38(3), pp. 413-421 (May 1983).
Shabalina, L. M.; Gun, R. B.; Samokhvalov, A. I.; Pankov, N. P.; *Pilot-Plant Oxidation of Petroleum Tar in the Presence of Iron (III) Chloride;* Neftepererab. Neftehim. (Moscow), (12), pp. 8-11 (1979).
Szilvasi, Lajos et al.; *Bitumens with High Asphaltene Content and High Thermal Stability for Pavements and Building Insulation;* Employee ( Service) Patent 39765 (Oct. 1974).
Djerfi, Aleksander; Cindric, Marjana; Javanovic, Jovan A.; *Blending of Bitumens;* Nafta (Zagreb), 33(12), pp. 693-698 (1982).
*Special Air-Blown Bitumen in Asphalt Road Construction;* Stationaere Mischwerk, Das V. 10, pp. 220-231.
Research Disclosure No. 142 (Feb., 1976), 14213.

*Primary Examiner*—David Brunsman
*Attorney, Agent, or Firm*—Bereskin & Parr

[57] ABSTRACT

A process for preparing a paving asphalt cement comprising two steps. In the first step, a high quality paving asphalt precursor, a low quality paving asphalt precursor, a non-paving asphalt precursor or a mixture thereof are catalytically oxidized to form a paving asphalt cement. In the second step, the catalytically oxidized paving asphalt cement is mixed with one or more of a high quality paving asphalt precursor, a low quality paving asphalt precursor, a non-paving asphalt precursor or a mixture thereof.

26 Claims, 2 Drawing Sheets

METHOD FOR PRODUCING SUPERIOR QUALITY PAVING ASPHALT AND PRODUCT PREPARED THEREFROM

This is a file wrapper continuation of application Ser. No. 07/530,531, filed May 30, 1990, now abandoned.

This invention relates to a method for producing a paving asphalt cement (hereinafter referred to as "premium paving asphalts") which, when mixed with an aggregate, forms an asphalt mixture having superior performance characteristics as compared to high quality asphalt mixtures produced by conventional processes. More specifically, this invention relates to a method for producing premium paving asphalts from asphalt precursor materials which, when treated by conventional asphalt manufacturing methods, typically tend not to produce a premium paving asphalt. Further, this invention relates to a method for upgrading crude oil fractions (residuum) which typically tend not to form an asphalt meeting the specifications of user agencies when treated by conventional asphalt manufacturing methods (hereinafter referred to as "non-paving asphalt precursors") and forming a paving asphalt product from these fractions.

Asphalt has been used for preparing road surfaces for several decades. Typically, the main ingredients of a paving asphalt mixture are an asphalt cement (approximately 5 wt. %) and aggregate material (approximately 95 wt. %). The asphalt cement is used to bind together the aggregate material and limit its mobility when a load is applied. An asphalt cement may be obtained from a crude oil by processes known in the art. Typically, an asphalt cement comprises vacuum tower bottoms (VTB) which is a residue material that is produced during the refining of conventional or synthetic petroleum crude oils. In some cases, the vacuum tower bottoms may be further treated prior to their use in an asphalt mixture. For ease of reference, those materials which have previously been used as an asphalt cement are hereinafter referred to as "paving asphalt precursors".

A problem with paving asphalt mixtures is that they are a fluid mass. During the application of loadings, particularly at warm temperatures, the road asphalt mixture tends to migrate from a position of higher loading to a position of lower loading i.e. lateral displacement. This tends to result in deformations in the surface of the road asphalt known as rutting. Rutting of road asphalt is undesirable as it forms channels in the pavement surface which are a safety hazard. Such ruts collect water during wet weather and this tends to cause significant reductions in tire-pavement friction levels and may contribute to the loss of control of a vehicle by skidding and or hydroplaning. Pavement rutting is a major concern of all user agencies and government transportation departments due to the cost involved in maintenance programs to repair the road surface and the effect of rutting on highway safety.

Various asphalt rheological factors will affect the degree of rutting which may be obtained under the same conditions. These include the penetration of the asphalt (as measured by ASTM D-5), the kinematic viscosity of the asphalt (as measured by ASTM D-2170), the absolute viscosity of the asphalt (as measured by ASTM D-2171) and temperature susceptibility.

In various countries, asphalt cements are graded on a different basis. Pursuant to the ASTM Standard Specification for Penetration—Graded Asphalt Cement for Use in Pavement Construction, designation D-946-82[e1], asphalts are graded as having penetrations in the following ranges: 40–50, 60–70, 85–100, 120–150, and 200–300. Pursuant to the ASTM Standard Specification for Viscosity - Graded Asphalt Cement for use in Pavement Construction (designation D-3381-83[e1]), asphalts are graded as AC-2.5 (viscosity=250±50 P @ 60° C.), AC-5 (500±100), AC-10 (1000±200), AC-20 (2000±400) and AC-40 (4000±800). In most parts of Canada, asphalts are graded according to their penetration (pen). In most parts of the United States, asphalts are graded according to their viscosity.

Within each grade of asphalt cement, as measured by penetration or viscosity, the asphalt cement will also be graded according to its quality. When the asphalt cement is graded according to its penetration, an asphalt cement having a higher viscosity at the same penetration generally is of a higher quality. Similarly, when asphalt cements are graded according to their viscosity, an asphalt cement which has a higher penetration at a given viscosity is of a better quality.

By way of example, a high quality 85–100 pen paving asphalt cement would have viscosities at 135° C. above about 280 cSt while a lower quality paving asphalt cement of similar penetration would have a viscosity in the range of from about 150 cSt to about 250 cSt. Similarly, a high quality AC-20 paving asphalt cement would have a penetration from about 50 to about 80 while a lower quality paving asphalt cement would have a penetration from about 40 to about 60.

The following table provides examples of paving asphalt cements conventionally manufactured from two crude oil sources. Crude oil source A provides a high quality asphalt cement. Crude oil source B provides a low quality paving asphalt cement that would be outside many user agency specifications. As is explained hereinafter, the high quality asphalt cement ex crude oil 'A' may also be referred to as a "high quality paving asphalt precursor". Similarly, the low quality paving asphalt cement may also be referred to as a "low quality paving asphalt precursor". The table also provides three examples of premium asphalt cements which are prepared according to the teachings of this invention and which exhibit superior pavement performance. These premium asphalt cements were prepared from a high quality paving asphalt precursor, a low quality paving asphalt precursor and a mixture thereof.

| Characteristic | Test Method | Lower Quality Paving Asphalt ex Crude 'B' | Higher Quality Paving Asphalt ex Crude A | Premium ex Crude 'A' | Premium ex Crude 'B' | Blend of 65% Crude B Precursor & 35% Cat-Oxid. Component ex Crude A Precursor |
|---|---|---|---|---|---|---|
| Penetration, 25° C. | ASTM D5 | 94 | 91 | 88 | 89 | 90 |
| Viscosity, Poise, 60° C. | ASTM D2170 | 700 | 1453 | 3338 | 1343 | 1289 |
| Viscosity, cSt, 135° C. | ASTM D2171 | 217 | 350 | 504 | 300 | 302 |
| Penetration, 4° C., 100 g, 5 s | ASTM D5 | 6 | 7 | 12 | 12 | 10 |

| Characteristic | Test Method | Lower Quality Paving Asphalt ex Crude 'B' | Higher Quality Paving Asphalt ex Crude A | Premium ex Crude 'A' | Premium ex Crude 'B' | Blend of 65% Crude B Precursor & 35% Cat-Oxid. Component ex Crude A Precursor |
|---|---|---|---|---|---|---|
| Penetration-Viscosity Number (PVN) | | −1.22 | −0.53 | −0.02 | −0.79 | −0.80 |
| Penetration Index (PI) | | −2.20 | −1.8 | −0.20 | −0.23 | −0.86 |

The foregoing Table sets out the characteristics of several 85-100 pen asphalt cements. As mentioned above, in various countries, asphalt cements are graded by penetration. In other countries, such as the United States, asphalts are graded persuant to viscosity. In this regard, reference has been made above to ASTM standard D-3381. Asphalt precursors may be categorized, not only by penetration, but also by viscosity. Accordingly, in reference to ASTM standards, a "high quality paving asphalt precursor" is a vacuum tower bottom residue from refining of crude blends suitable for production of paving asphalt cements meeting the requirements specified in ASTM D-3381, Table 2. A "low quality paving asphalt precursor" is a vacuum tower bottom residue from refining of crude or crude blends which are not suitable for production of paving asphalt cement meeting requirements specified in ASTM D-3381, Table 2, but are suitable for production of asphalts meeting the requirements specified in ASTM D-3381, Table 1. Further, a "non-paving asphalt precursor" is vacuum tower bottom residue from refining of crude or crude blends which are not suitable for production of asphalt cement meeting the requirements specified in ASTM D-3381 Table 1 or Table 2.

High quality paving asphalt cements may be obtained by careful selection of the crude oil from which the asphalt cement is to be made and the operating conditions used to obtain the vacuum tower bottoms. By making an appropriate selection, a high quality paving asphalt cement may be obtained. Such crude oils and operating conditions are known to those in the art. For ease of reference such VTB and similar materials which may be used as a high quality paving asphalt cement or from which a high quality paving asphalt cement is obtained comprise the high quality paving asphalt precursors. Conversely, those paving asphalt precursors from which a high quality paving asphalt cement may not be obtained are referred to hereinafter as "non-high quality paving asphalt precursors". Similarly, those VTB and similar material from which a lower quality paving asphalt cement is obtained or which may be used as a lower quality paving asphalt cement comprise the low quality paving asphalt precursors. Non-high quality paving asphalt precursors include low quality paving asphalt precursors and non-paving asphalt precursors.

A disadvantage with this selection system is that only a small number of crude oils will render a high quality paving asphalt cement. Further, once these materials are transported, such as in a pipeline, they will be mixed, at least to an extent, and may no longer yield a high quality asphalt cement.

Since a high quality paving asphalt crude oil is not always locally available, other alternatives have been developed. For example, performance enhancers such as polymers and additives are known in the art and have been incorporated into asphalt cements to meet the requirements for high quality paving asphalt cements. Examples of such polymeric performance enhancers are styrene butadiene styrene ("SBS"), ethylene vinyl acetate ("EVA"), styrene butadiene rubber ("SBR") and polyethylene. One disadvantage with this approach is that the incorporation of polymers into asphalt dramatically increases the cost of the resultant paving asphalt mixture.

Accordingly, in order to produce high quality asphalt cement, one must use a specially selected crude oil which can be transported to a manufacturing plant without the crude oil being intermingled with other crude oils. Alternately, one must utilize polymers and other expensive additives which will dramatically increase the price of the resultant asphalt mixture. In either case, the number of crude oils which may be selected for producing a high quality asphalt cement is limited.

Catalytic oxidation of asphaltic residuum is known in the art. Catalytic oxidation, which can be used to produce an asphalt cement having a higher penetration at a given softening point, has been generally used only in the production of roofing asphalt where increased flexibility at lower temperatures is required.

The earliest reference to catalytic oxidation of which the applicant is aware is U.S. Pat. No. 1,782,186. This patent discloses incorporating a non-alkaline earth metal salt (such as chloride of iron) in a petroleum residuum prior to blowing the residuum. It is reported that the blown product had an increased penetration with a corresponding decrease in brittleness.

Since that time, catalytic oxidation has become widely utilized in the roofing industry to prepare roofing asphalt cements. Catalytic oxidation is advantageous in the roofing industry since asphalt roof shingles are typically very thin and subjected to large daily temperatures fluctuations. Due to these conditions of use, asphalt shingles must have a high viscosity (a high softening point) while maintaining their flexibility (a high penetration). By catalytically oxidizing a roofing asphalt cement, an asphalt cement is obtained which has increased flexibility at a given softening point. Furthermore, catalytic oxidation results in a shortening of the oxidation time.

Catalytic oxidation of asphalt cements is discussed in greater detail in U.S. Pat. No. 4,338,137 which discloses a process for air-blowing asphalts in the presence of ferrous chloride. As is described at column 1, lines 12-16 of that patent, air-blowing raises the penetration of an asphalt cement at a given softening point.

Until recently, little attention has been paid to the use of catalytic oxidation in the preparation of road asphalts. In the early 1980's, the use of catalytically oxidized bituminous material to prepare paving asphalts has been considered. See for example J. S. Bahl, and Himmat Singh, *Air-blowing of Bitumens: Process Variables and Structural Parameters*, Revue de l'Institute Francais du Petrole, volume 38, no. 3 May-June 1983; and, L. N. Shabalin et al *Pilot Plant Oxidation of Petroleum Tar in the Presence of Iron Chloride*, Nefterpererab, Nefterkhyng, Moscow, 1979.

More recently, U.S. Pat. Nos. 4,456,523 and 4,456,524 disclose a process for producing a high grade asphaltic material which process comprises blowing a bituminous material to the desired grade in the presence of a catalytic amount of an inorganic carbonate salt or an organic carbonate salt as the oxidation catalyst. At column 1, lines 15-17, U.S. Pat. No. 4,456,523 discloses that the invention is concerned in one specific embodiment with chemically producing paving grade asphalt cements. The thrust of this patent is the use of new non-corrosive inexpensive readily available catalysts. These catalysts are to be used in preference of Lewis acid catalysts, such as ferric chloride and ferrous chloride, which are very corrosive (column 2, lines 57-65).

It is desirable to provide premium paving asphalts. These paving asphalt cements have performance characteristics which are equal to or superior than those of high quality paving asphalt cements without requiring the use of polymers or additives.

It is also desirable to provide a method of upgrading crude oil residues so as to obtain paving asphalt cements from crude oils which would not otherwise render high or low quality paving asphalt cements.

It is further desirable to provide means for increasing the number of crude oils which may be utilized to prepare paving asphalt cements having good performance characteristics.

According to the present invention, there is provided a process to prepare a paving asphalt cement comprising the steps of (a) catalytically oxidizing an asphalt precursor to form a catalytically oxidized asphalt cement; and, (b) mixing the catalytically oxidized asphalt cement so obtained with an asphalt precursor to form a paving asphalt cement. This two step process may be used to obtain various products. The asphalt cement of each of steps (a) and (b) may be individually selected from one or more of a high quality paving asphalt precursor, a low quality paving asphalt precursor or a non-paving asphalt precursor and mixtures thereof.

According to one embodiment of this invention, a process for preparing premium paving asphalts is provided. As has been mentioned hereinbefore premium paving asphalts are paving asphalt cements that provide pavement performance superior to that provided by asphalt cements manufactured by conventional processes. Pursuant to the process set out in this application, a paving asphalt precursor is catalytically oxidized and then mixed with a paving asphalt precursor to form a premium asphalt cement. Preferably, the paving asphalt precursor which is catalytically oxidized is a high quality paving asphalt precursor. More preferably, the paving asphalt precursor which is mixed with the catalytically oxidized asphalt is also a high quality paving asphalt precursor.

According to yet another embodiment of this invention, a non-high quality paving asphalt precursor may be upgraded to provide a high quality paving asphalt cement by catalytically oxidizing the non-high quality paving asphalt precursor and then mixing this catalytically oxidized product with a paving asphalt precursor or a non-paving asphalt precursor. The non-high quality paving asphalt precursor may be either a low quality paving asphalt precursor or a non-paving asphalt precursor. Preferably, the precursor used in each of the two steps is a low quality paving asphalt precursor.

According to yet another embodiment of this invention, a non-paving asphalt precursor may be upgraded to provide a paving asphalt cement by catalytically oxidizing the precursor and blending this catalytically oxidized precursor with a precursor (preferably the non-paving asphalt precursor) to produce a paving asphalt or a premium paving asphalt.

Preferably, the precursor material is a vacuum tower bottom which is obtained from the distillation of conventional or synthetic crude oils as is known in the art. The penetration of the vacuum tower bottoms may be from about 60 to about 600 and more preferably from about 150 to about 400 as measured by ASTM D-5 @ 25° C. Preferably, the vacuum tower bottoms which are utilized are the softest material which has a minimum flash point above the catalytic oxidation temperature.

The catalytic oxidation is preferably conducted using 0.05-1 wt. %, and more preferably 0.2-0.5 wt. %, of dry catalyst based upon the total weight of the oxidized product. The catalytic oxidation is conducted at a temperature of from about 205° (400° F.) to about 290° C. (550° F.) and, more preferably, from about 230° C. (450° F.) to about 260° C. (500° F.). The precursor material may be catalytically oxidized until it has a penetration of from about 5 to about 100, more preferably about 15-40 and, most preferably about 15-30 as measured by ASTM D-5 @ 25° C.

The catalyst may be any of those which are known in the art. Suitable catalysts are disclosed in U.S. Pat. Nos. 1,782,186; 2,450,756; 2,375,117 and 2,649,384. In addition, those disclosed in European Patent Application Number 0053041 may also be employed. Preferably, the catalyst is an iron chloride namely one or more of ferrous chloride or ferric chloride.

The catalytically oxidized precursor is back mixed with unoxidized vacuum tower bottoms. The two products are mixed to obtain a product having the desired target penetration. The unoxidized vacuum tower bottoms and the catalytically oxidized product may be mixed to form an asphalt product having a penetration at 25° C. from about 40 to about 400, more preferably the blended material has a penetration of 200-300, 150-200, 120-150, 85-100, 60-70 or 40-50. Corresponding viscosity graded products may be produced which would include AC-40, AC-30, AC-20, AC-10, AC-5 and AC-2.5.

The use of the process set out in the above embodiments allows greatly increased flexibility in the selection of a crude oil to prepare a premium paving asphalt mixture which has superior performance qualities to those of high quality paving asphalts. Further it allows the use of crude oils whose residuum would not otherwise be suitable for use even as a low quality paving asphalt cement, to be used to prepare a paving asphalt which may have performance characteristics equal to or superior to those of a high quality asphalt. Further, the premium asphalts produced according to the above embodiments have mix performance characteristics which are equal to or superior to those which are obtained using polymer modified asphalts.

Quite surprisingly asphalts mixtures prepared using the asphalt cements of this invention have demonstrated up to a 75% decrease in rutting and will allow an increase in traffic loadings of up to 1000% or more before equivalent amounts of deformation occur as would be obtained from conventional quality paving asphalts. In addition such asphalt mixtures have demonstrated a 50% decrease in low temperature mix stiffness which allows significant improvements in preventing pavement low temperature cracking.

BRIEF DESCRIPTION OF THE DRAWINGS

The substance and advantages of the invention may be more completely and fully understood by means of the following description of the preferred embodiment of the invention and the accompanying figures in which.

In the first step of the process, a paving asphalt precursor is catalytically oxidized to form a catalytically oxidized asphalt cement.

As discussed above, paving asphalts may be produced from asphaltic materials which are derived from several sources which are known in the industry. The starting material which may be employed in the process of this invention includes high quality paving asphalt precursors, crude oil residuum which would not otherwise produce a paving asphalt cement when processed according to conventional asphalt manufacturing process (a non-paving asphalt precursor), and crude oil fractions, which would not produce a high quality paving asphalt cement when processed according to conventional asphalt manufacturing processes (a non-high quality paving asphalt precursor).

By way of emphasis, it should be noted that the various precursor materials employed as a starting material in the instant process to obtain a premium paving asphalt cement would conventionally be used as asphalt cements. More particularly, according to the instant invention, a high quality paving asphalt cement may be utilized as a high quality paving asphalt precursor to obtain a premium paving asphalt. Similarly, a low quality paving asphalt cement may be employed as a low quality paving asphalt precursor to obtain a high quality paving asphalt cement or a premium paving asphalt. Further, a residuum which, except for a few limited exceptions, could not be utilized even as a low quality asphalt cement may be employed as a non-paving asphalt precursor pursuant to this invention to obtain a low quality paving asphalt cement, a high quality paving asphalt cement, or, possibly a premium paving asphalt.

A paving asphalt precursor for use in this invention may be of varied character and includes paving asphalt precursors and non-paving asphalt precursors. Paving asphalt precursors may be divided into two classes as either high quality paving asphalt precursors or low quality paving asphalt precursors. Such a precursor (asphalt cement) may be a petroleum residuum or flux which remains following the separation of vaporizable hydrocarbons through vacuum gas oil fractions from the residuum, or any relatively high molecular weight extract obtained from petroleum refining or virgin naturally occurring asphalt. As is known in the industry, a petroleum residuum or flux may be obtained by injecting a conventional or synthetic crude oil, at a temperature of about 340° to about 400° C., into a fractionating column. The lighter fractions are separated as overhead products. The residuum from the fractionating column is straight reduced asphalt cement. Today, crude oils typically may not be distilled at atmospheric pressure to produce a paving asphalt cement since the crude oil typically contains high percentages of high boiling fractions. Accordingly, as a supplement to the atmospheric process, a second fractionating tower (a vacuum tower) is added. The vacuum tower bottoms provide a paving asphalt cement.

Suitable vacuum tower bottoms may have a penetration @ 25° C. of from about 60 to 600 or more. More preferably, the vacuum tower bottoms have a penetration from about 100 to about 500 and, most preferably from about 150 to about 400. Preferably, the vacuum tower bottoms will be the softest material which has a minimal flash point above the temperature at which the catalytic oxidation is conducted. For example, when the catalytic oxidation is conducted at a temperature of about 205° C. (400° F.) to about 260° C. (500° F.) the vacuum tower bottoms will have a minimum flash point of about 260° C. (500° F.).

As discussed above, catalytic oxidation is known in the art. The catalytic oxidation process of the present invention may be conducted in the manner which is known in the art. In the catalytic oxidation process, a paving asphalt precursor is fed into a vessel and is heated to a temperature which may be between about 205° C. (400° F.) and about 290° C. (550°)F. An oxidizing gas, such as air, is introduced into the paving asphalt precursor to oxidize the precursor in the presence of a catalyst. The process is carried out for a sufficient length of time to provide an oxidized asphalt cement having the desired penetration.

As mentioned hereinbefore the catalyst may be any of those disclosed in U.S. Pat. Nos. 1,782,186; 2,450,756; 2,375,117 and 2,649,384. Further, the catalyst may be one of those disclosed in European Patent Application Number 0053041. The catalyst may be a phosphorous compound such as phosphorous pentoxide and phosphoric acid, a chloride such as the chlorides of zinc, iron, copper, antimony or aluminium, a sulphate such as zinc sulphate or aluminium sulphate, carbonates such as sodium carbonate, bicarbonate salts of sodium, calcium, magnesium, barium, strontium, lithium, ammonium, potassium, bismuth, lead, tetra-alkylphosphonium, tetraarylphosphonium, tetraalkylammonium, trialkylammonium, dialkylammonium, transition metals or rare earth metals, boron trifluride, lead oxide, lead naphthanate and sulphur. Preferably, the catalyst is phosphoric acid, phosphorous pentoxide, ferric chloride or ferrous chloride and, more preferably, the catalyst is ferrous chloride or ferric chloride.

A catalytic amount of the catalyst may be used. The amount of catalyst which is used may vary from 0.05–1 wt. % of dry catalyst based upon the total weight of the oxidized product. More preferably, 0.2–0.5 wt. % of dry catalyst is utilized. The catalytic oxidation will preferably be conducted at a temperature of from about 205° C. (400° F.) to about 290° C. (550° F.) and, more preferably, from about 230° C. (450° F.) to about 260° C. (500° F.).

The amount of time required to catalytically oxidize the paving asphalt precursor will vary depending upon a number of factors including the type of crude, the consistency of the asphalt precursor, the temperature at which the catalytic oxidation is conducted, the air flow rate, the configuration of the oxidizing vessel and the amount of catalyst. When preparing an 85–100 pen paving asphalt (AC-10 to AC-20), the catalytic oxidation may be conducted until the paving asphalt precursor has a penetration of from about 5 to about 100, more preferably from about 15 to about 40 and, most preferably, from about 15 to about 30 as measured by ASTM D-5 @ 25° C.

In order to obtain the surprisingly large increase in traffic loading and decrease in rutting which may be obtained when utilizing the products of this invention, the catalytically oxidized paving asphalt precursor is back mixed with unoxidized paving asphalt precursor. These materials may be mixed using conventional equipment. The precursor material with which the catalytically oxidized asphalt cement is back mixed may be the same as that which was employed in the first step of the process. However, this is not essential. The catalytically oxidized asphalt cement may be mixed with a non-paving asphalt precursor, a non-high quality paving asphalt precursor or a high quality paving asphalt precursor. The precursor material which is employed is selected so that, bearing in mind the properties of the catalytically oxidized cement asphalt, the target properties are obtained. Preferably, the precursor material which is employed in the first and second steps, namely the catalytic oxidation and the backblending, is a high quality paving asphalt precursor.

The oxidized and unoxidized products are mixed in suitable proportions to obtain an asphalt cement having the desired target penetration. Accordingly, an asphalt may be prepared which would meet one of the following penetration grades namely 40–50; 60–70; 85–100; 120–150; 150–200; 200–300; and 300–400 or any other grade which may be required. Preferably the asphalt will have its penetration and/or viscosity optimized to provide the desired pavement engineered characteristics to minimize pavement deformation (rutting) as well as low temperature cracking.

By utilizing the process of the present invention both non-paving asphalt precursors and paving asphalt precursors may be utilized to prepare a paving asphalt cement which may have physical characteristics (e.g. viscosity, penetration, and temperature susceptibility) equal to or superior to those of conventional high quality asphalts. Further, the road performance of premium paving asphalts prepared according to this process have performance characteristics equal to or superior to those of polymer modified paving asphalts. Accordingly, this invention allows paving asphalt cements to be made from crude oils which hitherto have not rendered a fraction which is suitable for making high quality paving asphalt cements (a non-high quality paving asphalt precursor) or even a paving asphalt cement (a non-paving asphalt precursor). These non-paving asphalt precursors and non-high quality paving asphalt precursors may be utilized, by this invention, to prepare premium paving asphalts.

As mentioned above, paving asphalts prepared from an asphalt cement prepared according to this invention have up to a 75% decrease in rutting as compared to asphalt pavements prepared from conventional asphalt cements under the same loading conditions. Further, such asphalt pavements may also carry an increased traffic loading (up to 1000% or more) before reaching the same level of deformation as would be achieved with an asphalt pavement made from asphalt cement made by conventional processes. In addition such asphalt pavements also exhibit improved low temperature flexibility, and a 50% decrease in low temperature pavement stiffness.

Five asphaltic materials were analyzed for their chemical composition. Two precursor materials were analyzed namely a higher quality precursor ex crude "A" and a lower quality precursor ex crude "B". Three asphalt cements were also analyzed namely a conventional high quality paving asphalt ex crude "A", a premium paving asphalt ex crude "A" and a premium paving asphalt ex crude "B". The results are set out in the following table.

| | CHEMICAL COMPOSITION OF PREMIUM ASPHALTS, ASTM D-4124 | | | | |
|---|---|---|---|---|---|
| | Higher Quality VTB Asphalt Precursor Ex Crude "A" | Lower Quality VTB Asphalt Precursor Ex Crude "B" | Conventional High Quality Paving Asphalt Ex Crude "A" | Premium Asphalt Ex Crude "A" | Premium Paving Asphalt Ex Crude "B" |
| % Asphaltene | 10.7 | 7.7 | 16.3 | 22.1 | 15.5 |
| % Saturates | 14.0 | 18.0 | 9.6 | 12.4 | 15.3 |
| % Aromatics | 41.9 | 38.4 | 38.4 | 42.4 | 40.6 |
| % Polars | 33.4 | 35.9 | 35.7 | 23.1 | 28.6 |

Figure 1:
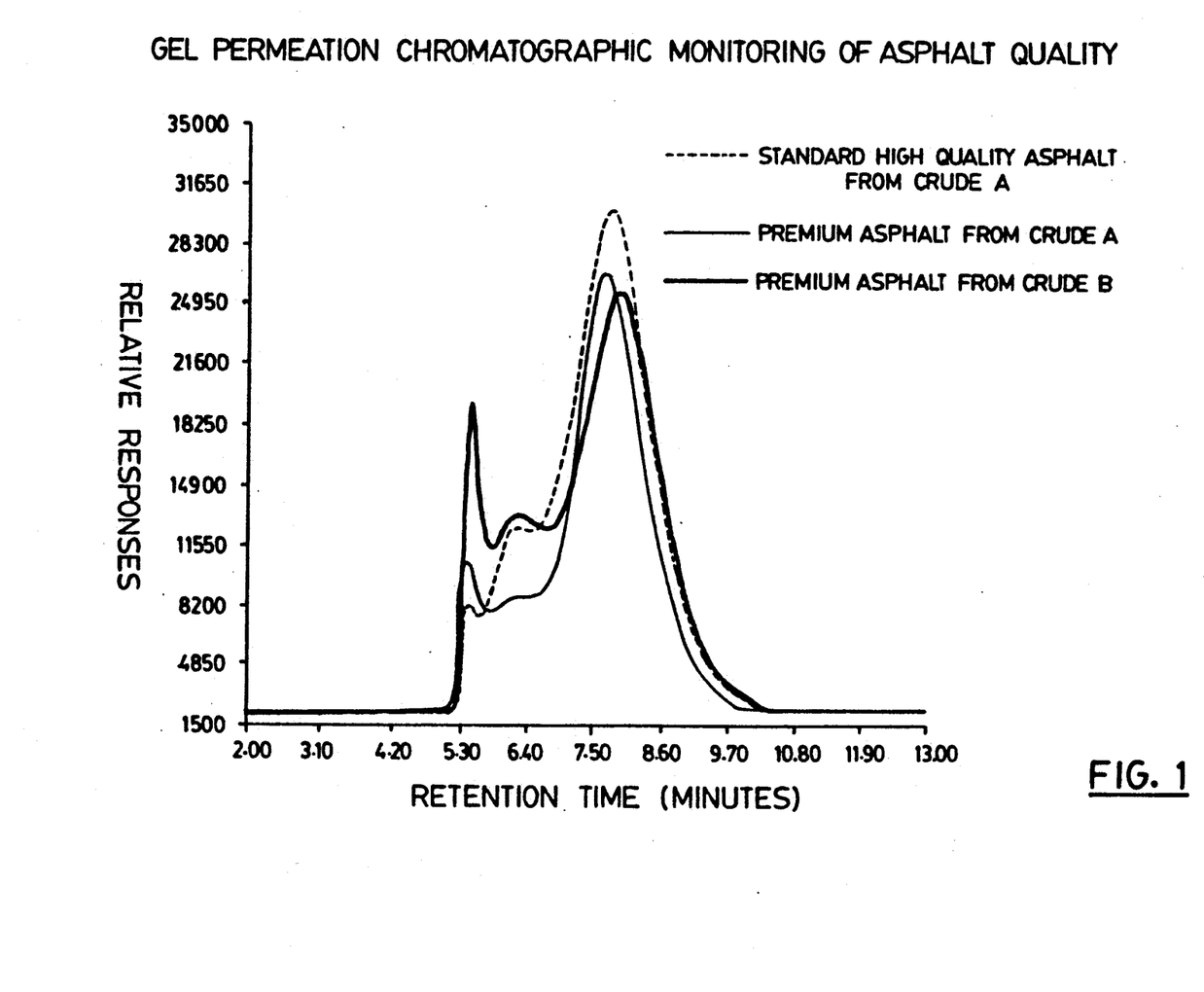
FIG. 1 is a graph of response measured against retention time for two premium paving asphalts, and a high quality paving asphalt.

FIG. 1 which is attached hereto is a graph of the gel permeation chromatographic results of three asphalts. The graph measures retention time in minutes against relative responses. This graph measures the responses for three different asphalts namely:
1. a high quality paving asphalt cement prepared by conventional processes from crude oil source 'A';
2. a premium paving asphalt prepared from a high quality paving asphalt precursor obtained from crude oil 'A'; and, 3. a premium paving asphalt prepared from crude oil 'B'—a crude oil source which, by conventional processes, provides a low-quality paving asphalt.

As is shown in FIG. 1, the premium asphalts have a decreased response at the 8 minute mark and an increased response at about the 5.5 minute mark. Without being limited to any extent by theory, it is believed that the improved performance of the premium asphalts results from a change in the molecular structure of the constituents of the asphalt cement when treated according to the instant process.

In order to compare the performance characteristics of asphalt pavements, we have developed a pavement performance simulator which provides us with a procedure to compare the road performance of different asphalts. This pavement performance simulator is described hereinbelow.

The pavement performance simulator allows asphalt pavements to be tested under full-scale dynamic loads simulating actual road conditions. The simulator comprises three major components:
(a) a large-sized pavement test pit in which pavement materials are placed and compacted in layers simulating field construction;
(b) an MTS loading system (Model No. MTS 810) capable of applying dynamic loads in magnitude, shape and frequency simulating heavy field trucks; and,
(c) an electronic data acquisition system for measuring and displaying test variables such as applied loads and resultant deformation during the test.

The pavement test pit measures 1.8 meters in width, 5.50 meters in length and 0.90 meters in height. The test pit is constructed with walls and a floor constructed from 13 mm thick steel. The test pit is placed over a reinforced concrete foundation which is 300 mm thick. The test pit is equipped with a drainage system to control moisture levels in the pavement base and subgrade layers.

The load is applied to the test pit via the MTS loading system which is secured to a loading frame. The loading frame is positioned above the test pit and designed to allow testing at preset locations. The test pit and the loading frame are designed to produce a total deflection of no more than 0.13 mm under a typical testing load of 40 KN (9.0 Kips). The capacity of the loading system is 100 KN (22.0 Kips). The load actuator unit is a hydraulic controlled MTS loading system (model MTS 244-22) equipped to perform tests over a wide range of speeds including those for pavement low-temperature testing. The test pit is also equipped with an environmental chamber which allows testing the pavement structure under controlled temperature conditions up to 60° C.

In order to further simulate actual road conditions, the test pit is filled with sub-grade materials. Two feet of sub-grade sand is placed in the bottom of the test pit. The sub-grade sand is compacted in two layers, each one foot thick, by a vibratory plate. Density checks are made using a Troxler gauge to ensure that optimum density is achieved. Samples of the sub-grade material are taken for determination of sub-grade density and water content (ASTM D-1557 and D-698). Typically, the test pit is operated using sub-grade moisture and sub-grade density of 3-6% and 1800-2000 kg/m³ respectively.

Sub-grade strength is measured in situ by using the California Bearing Ratio (CBR) test (ASTM D-1883). The strength of the sub-grade is manipulated by adjusting the moisture content in the test pit. Final in-place density of the sub-grade is determined by the Troxler gauge using ASTM test D-2922 and D-3017. The final profile of the prepared subgrade surface is measured across the test pit at the central line where the load will be applied. Typically the simulator is operated using a sub-grade strength of 8-12% CBR.

Well graded granular base material is placed and compacted on top of the sub-grade layer. Typically a 0.15-0.20 meter layer of granular base is utilized. Once again, compaction is also done by use of a vibratory plate. Final in-place density of the granular base is determined by the Troxler gauge and a final transverse profile of the prepared base surface is measured. Typically the simulator is operated with the granular base material having a moisture content and density of 3-6% and 2300-2400 kg/m³ respectively.

In order to obtain results which may be compared, the asphalt concrete test slabs are constructed in a uniform manner. A hot mix test slab is constructed using a pre-made frame. The pre-made frame positions the slab in the test pit and contains the asphalt concrete while the mixture is being compacted. The test slab is constructed to be a square of 0.6 meters in length and in width and 80 mm in thickness. The test slab is compacted using the MTS load actuator and a compaction plate which covers the inside surface of the pre-made frame. Prior to the plate compaction, a steel roller is used to compact and knead the surface. The test slab is made in two layer, each 40 mm in compacted thickness. The in-place density and asphalt cement content are determined by the Troxler gauge. (ASTM D-2950).

Typical asphalt densities which are obtained are 2200 to 2250 kg/m³ representing 92-94% of Marshall density.

The final surface profile of the pavement is taken across the width of the test pit at the centre line of the test slab. Surface profile measurements are carried out using an electronic profilometer.

In conducting the test, a 40 KN (9 Kips) cyclic load was applied on the pavement structure at a rate of 9 cps. A loading pressure of (80 psi) was applied through a 300 mm circular loading plate. This pressure loading at 9 cps simulates the passage over the asphalt of the wheel of a truck which weighs approximately 40 KN (9 Kips), and which is travelling at a speed of approximately 50 km/h. During the testing, the deformation of the test slab under the centre line of the load applicator was measured. Further, the number of cycles required to obtain that amount of deformation was recorded. "Permanent deformation" refers to the deformation in the surface of an asphalt concrete test slab after three million load cycles.

The "percent reduction in pavement rutting" (PRPR) is defined as follows:

$$PRPR = \frac{PD_1 - PD_2}{PD_1} \times 100$$

where
$PD_2$ = the permanent deformation of a paving asphalt mixture prepared using a paving asphalt cement which cement is prepared using the process of this invention
and $PD_1$ = the permanent deformation of a paving asphalt mixture prepared using (1) the same aggregates utilized in preparing the paving asphalt mixture of $PD_2$ and (2) a high quality paving asphalt cement manufactured according to conventinal processes.

As is appreciated, by utilizing the process of this invention, significant reductions in pavement rutting is obtained. These reductions are obtained without the use of performance enhancers. Optionally, performance enhancers may, if desired, be incorporated in the paving asphalt cement prior to the production of the paving asphalt mixture.

Five examples are given in the following section to show the performance superiority of premium asphalts prepared according to the process of the present invention. Example 1 compares the performance of a conventional high-quality paving asphalt with that of a premium paving asphalt formulated using the same crude oil. The aggregate is a high stability mixture. Example 2 compares the performance of the two asphalt cements of Example 1 but using a low stability aggregate mix. Example 3 compares the performance of a premium paving asphalt with that of two polymer modified asphalts and Example 4 exemplifies the application of the process of the present invention in the production of premium paving asphalts from inferior crude oils which provide only low quality paving asphalt cements when treated by conventional processes.

EXAMPLE 1

Two 85-100 pen asphalt cements were prepared. Both of these asphalts are described briefly below.

1. A conventional high quality 85-100 pen asphalt cement obtained from crude oil "A". This sample was used as a control.

2. A catalytically oxidized and back blended premium paving asphalt prepared according to the process of the present invention using a high quality paving asphalt precursor from crude oil "A". The oxidation was conducted at 232° C. (450° F.) using 0.2 dry wt. % $FeCl_3$. The high quality paving asphalt precursor had a penetration of 341 (100 g, 5 sec, 25° C., ASTM D-5) and a viscosity of 785 cSt at 100° C. (ASTM D-2170). The asphalt precursor was air blown with the catalyst for about 4 hours to obtain an asphalt cement having a penetration of 30 (25° C., 100 g, 5 sec, ASTM D-5). This 30 pen paving asphalt cement was back mixed with the unoxidized high quality paving asphalt precursor at a ratio of 51:49 (catalytically oxidized to non-catalytically oxidized material) to produce an 85-100 pen premium asphalt cement having a penetration of 89 as shown in Table 1.

The properties of these two asphalts cements are set out in Table 1.

TABLE 1

| CHARACTERISTIC | METHOD REFERENCE | HIGH-QUALITY CONVENTIONAL ASPHALT EX CRUDE 'A' | PREMIUM ASPHALT Ex CRUDE 'A' |
|---|---|---|---|
| Viscosity, poise, 60° C. (140° F.) | ASTM D2171 | 1306 | 2337 |
| Viscosity, cSt. 135° C. (275° F.) | ASTM D2170 | 321 | 456 |
| Pen. 25° C. (77° F.), 100 g, 5 s | ASTM D5 | 92 | 89 |
| Pen. 4° C. (39° F.), 200 g, 60 s | ASTM D5 | 28 | 38 |
| Pen. 4° C. (39° F.), 100 g, 5 s | ASTM D5 | 8 | 12 |
| PVN | | −0.7 | −0.1 |
| PI | | −2.1 | −0.2 |

Figure 2:
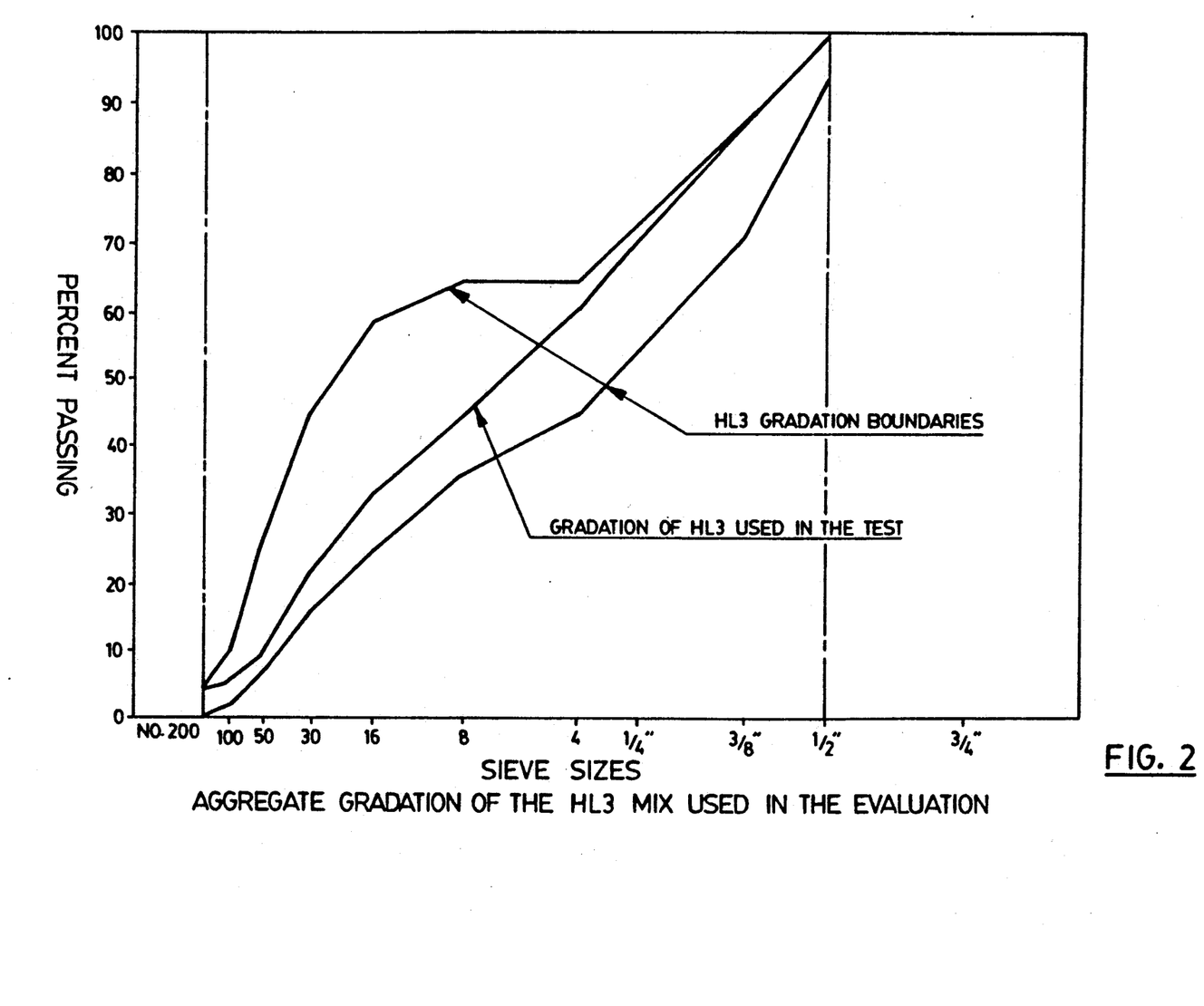
FIG. 2 is the aggregate gradation of the HL3 mix used to prepare the paving asphalts of Example 1.

Each of the asphalt cements were used to prepare a paving asphalt mixture. For this purpose an HL3 type mix was used. The total aggregate mix gradation of this high stability mix is set out in FIG. 2. This mixture contained 40% coarse aggregate, 25% sand, 35% screenings and 5.8% asphalt cement. The Marshall mix characteristics for these two asphalts were determined. The results are set out in Table 2.

TABLE 2

SUMMARY OF MARSHALL MIX DESIGNS FOR 85-100 PEN ASPHALTS HIGH STABILITY MIX

| Asphalt Type | Conventional High Quality Asphalt Ex Crude 'A' | Premium Asphalt Ex Crude 'A' |
|---|---|---|
| Voids, % | 3.6 | 3.0 |
| Flow, 0.25 mm | 14 | 13.5 |
| Stability N (lbs) | 15,790(3550) | 16,573(3726) |
| V.M.A., % | 15.5 | 14.7 |

The asphalt and road bed were prepared according to the description of the pavement performance simulator above. A summary of the as-constructed test data is set out in Table 3.

TABLE 3

SUMMARY OF AS-CONSTRUCTED TEST DATA HIGH STABILITY MIX

| Test Asphalt Type | Conventional High Quality Ex Crude 'A' | Premium Asphalt Ex Crude 'A' |
|---|---|---|
| Subgrade | | |
| Subgrade Density kg/m³ (pcf) | 1874(117) | 1874(117) |
| Measured Moisture, % | 4.7 | 4.8 |
| Granular Base 'A" | | |
| Troxler Density, kg/m³ (pcf) | 2435(152) | 2451(153) |
| Troxler % Moisture | 5.6 | 5.5 |

TABLE 3-continued

SUMMARY OF AS-CONSTRUCTED TEST DATA HIGH STABILITY MIX

| Test Asphalt Type | Conventional High Quality Ex Crude 'A' | Premium Asphalt Ex Crude 'A' |
|---|---|---|
| Measured Avg. Thickness, mm Asphalt Slab (HL3) | 181 | 182 |
| Measured Average Thickness, mm | 80 | 79 |
| Bulk Specific Gravity | 2.210 | 2.230 |

The testing then proceeded by applying a loading pressure of 552 kpa (80 psi) through the 300 mm circular loading plate. The total loading pressure of 40 KN (9 Kips) was applied at a rate of 9 cps. The testing was performed at room temperature (23°±2° C.). The permanent deformation was measured at various load cycles. The permanent deformation after three million cycle loads was determined. In addition, the total number of cycles required to obtain a 10 mm permanent deformation were recorded. These results are set out in Tables 4 and 5.

TABLE 4

COMPARISON OF PERMANENT DEFORMATION AFTER THREE MILLION LOAD CYCLES

| Asphalt Type | Deformation, mm | % Reduction in Permanent Deformation |
|---|---|---|
| Conventional High Quality Ex Crude 'A' | 11.9 | — |
| Premium Ex Crude 'A' | 6.0 | 50% |

TABLE 5

COMPARISON OF TOTAL LOAD CYCLES AT 10 MM PERMANENT DEFORMATION

| Asphalt Type | Total No. of Load Cycles |
|---|---|
| Conventional High Quality ex Crude 'A' | 2 450 000 |
| Premium Ex Crude 'A' | 8 000 000* |

*Estimate based upon an extrapolation of test data. After three million load cycles, there was a deformation of 6 mm.

As shown in Tables 4 and 5, the performance of the premium paving asphalt was superior to that of the conventional high quality paving asphalt. The control asphalt provided the higher deformation (worse performance) of the two sections tested. The premium asphalt according to the instant invention provided the better performance. Comparing the permanent deformation in the rest sections after three million load cycles, the premium paving asphalt showed a 50 % reduction in rutting.

Comparing the total number of load cycles for a 10 mm deformation in the two test asphalts, the premium asphalt demonstrated a superior performance for carrying about 8,000,000 load cycles as compared with 2,450,000 load cycles carried by the control asphalt. The premium asphalt had an improvement of 326% in pavement load carrying capacity.

Since most pavement rutting occurs during warm summer months, it is appropriate to test for rutting at high temperatures. Example 1 was repeated at 50° C. using an environmental chamber designed for use in the pavement test pit. The premium asphalt demonstrated a 75% decrease in pavement rutting and more than a ten fold increase in pavement load carrying capacity at 50° C. In this case, the testing was terminated after 900,000 load cycles. After 900,000, the conventional high quality asphalt ex crude "A" had a permanent deformation of 25.4 mm. In comparison, the premium asphalt had a permanent deformation of only 6.4 mm. The total number of load cycles required to obtain a permanent deformation in the premium asphalt of 6 mm was 770,000 while the number of load cycles required to obtain a 6 mm deformation in the conventional high quality paving asphalt was 24,000.

EXAMPLE 2

The two 85-100 pen asphalt cements of Example 1 were used in this Example. The aggregate material used in this Example had a lower stability than the mix employed in Example 1. The Marshall mix characteristics of the aggregate used in this Example are set out in Table 6. The as constructed test data is shown in Table 7.

TABLE 6
MARSHALL MIX DESIGN CHARACTERISTICS
LOWER STABILITY MIX

|  | Conventional High Quality Asphalt Ex Crude 'A' | Premium Asphalt Ex Crude 'A' |
|---|---|---|
| Voids, % | 4.2 | 3.7 |
| Stability N, (lbs) | 10,710(2408) | 13,201(2968) |
| Flow, 0.25 mm | 9.8 | 11.0 |
| V.M.A. % | 16.0 | 15.2 |

TABLE 7
SUMMARY OF AS-CONSTRUCTED TEST DATA
LOWER STABILITY MIX

|  | High Quality Asphalt Ex Crude 'A' | Premium Asphalt Ex Crude 'A' |
|---|---|---|
| Subgrade |  |  |
| Subgrade Density, kg/m³ (pcf) | 1858(116) | 1842(115) |
| Moisture % | 4.5 | 4.8 |
| Granular Base 'A' |  |  |
| Density kg/m³ (pcf) | 2326(145.2) | 2259(141.0) |
| Moisture % | 4.2 | 3.8 |
| Thickness, mm | 217 | 210 |
| Asphalt Slab (HL3) |  |  |

TABLE 7-continued
SUMMARY OF AS-CONSTRUCTED TEST DATA
LOWER STABILITY MIX

|  | High Quality Asphalt Ex Crude 'A' | Premium Asphalt Ex Crude 'A' |
|---|---|---|
| Thickness, mm | 75 | 75 |
| Bulk Specific Gravity | 2.193 | 2.196 |

The load testing was carried out at room temperature according to the method of Example 1. The permanent deformation after 1,000,000 load cycles was determined and the total number of cycles required to obtain a deformation of 6.0 mm was recorded. The results are set out in Tables 8 and 9 respectively.

TABLE 8
PAVEMENT RUTTING AFTER 1,000,000 LOAD CYCLES

| Asphalt Type | Deformation, mm | % Reduction in Pavement Rutting |
|---|---|---|
| High Quality Asphalt Ex Crude 'A' | 12.0 | — |
| Premium Asphalt Ex Crude 'A' | 3.75 | 69% |

TABLE 9
COMPARISON OF TOTAL LOAD CYCLES FOR
6.0 mm PERMANENT DEFORMATION

| Asphalt Type | Total No. of Load Cycles |
|---|---|
| High Quality Asphalt Ex Crude 'A' | 540,000 |
| Premium Asphalt Ex Crude 'A' | 3,000,000 |

As demonstrated in Tables 8 and 9, the premium paving asphalt had superior performance characteristics to that of the high quality paving asphalt produced from the same crude oil source. The premium asphalt showed a 69% reduction in pavement rutting and more than a 5 fold increase (556%) in load carrying capacity.

EXAMPLE 3

Three 85-100 pen paving asphalt cements were tested in this Example to compare the pavement performance of two polymer modified paving asphalts and one premium paving asphalt prepared according to the process of the present invention. One of the commercial polymer modified asphalts which was tested was modified by the addition of "SBS" styrene-butadiene-styrene (STYRELF TM) and the other was modified by the inclusion of "EVA" ethylene-vinyl-acetate. Each of the three test asphalts were obtained from the same crude oil "A" source. The premium asphalt was prepared as discussed earlier in Example 1. The properties of the test asphalts are set out in Table 10. The Marshall mix characteristics are given in Table 11 and the as constructed test data is shown in Table 12.

TABLE 10

| Characteristics | Reference | Premium Asphalt Ex Crude 'A' | "SBS" Polymer Modified Asphalt Ex Crude 'A | "EVA" Polymer Modified Asphalt Ex Crude 'A' |
|---|---|---|---|---|
| Viscosity, Poise 60° C. (14° F.) | ASTM D2171 | 2337 | 4077 | 2619 |
| Viscosity, cSt, 135° C. (275° F.) | ASTM D2170 | 456 | 974 | 833 |
| Pen 25° C. (77° F.), 100 g, 5 sec | ASTM D5 | 89 | 93 | 89 |
| Pen 4° C. (39° F.), 200 g, 60 sec | ASTM D5 | 38 | 34 | 32 |
| Pen 4° C. (39° F.), 100 g, 5 sec | ASTM D5 | 12 | 10 | 9 |
| PVN |  | −0.1 | +1.0 | +0.5 |
| PI |  | −0.2 | −0.9 | −1.10 |

TABLE 11

SUMMARY MARSHALL MIX DESIGNS FOR 85-100 Pen Asphalts

|  | Premium | "SBS" Modified | "EVA" Modified |
|---|---|---|---|
| Voids % | 2.8 | 3.8 | 3.6 |
| Flow, 0.25 mm | 16.7 | 16.6 | 15.8 |
| Stability N, (lbs) | 17,789 (4002) | 16,213 (3647) | 15,406 (3466) |
| V.M.A. % | 15.2 | 16.0 | 15.6 |

TABLE 12

AS CONSTRUCTED TEST DATA PREMIUM VERSUS POLYMER MODIFIED 85-100 PEN ASPHALTS

|  | Premium Ex Crude 'A' | Polymer Modified Asphalt STYRELF (SBS) | Polymer Modified Asphalt ELVAX (EVA) |
|---|---|---|---|
| Test Asphalt Type |  |  |  |
| Subgrade Density kg/m³ (pcf) | 1875 (117) | 1840 (115) | 1860 (116) |
| % Moisture Granular Base "A" | 4.2 | 4.0 | 3.9 |
| Density kg/m³ (pcf) | 2435 (152) | 2403 (150) | 2371 (148) |
| % Moisture | 4.4 | 4.0 | 4.7 |
| Thickness, mm Asphalt Slab (HL3) | 189 | 192 | 202 |
| Measured average thickness, mm | 81 | 79 | 78 |

The testing was conducted at room temperature method of Example 1. The permanent deformation after 3,000,000 load cycles was determined and the total number of cycles required to obtain a deformation of 6.0 mm was recorded. The results are set out in Tables 13 and 14 respectively.

TABLE 13

COMPARISON OF PAVEMENT PERMANENT DEFORMATION AFTER 3,000,000 LOAD CYCLES

| Asphalt Type | Deformation, mm |
|---|---|
| Premium Asphalt Ex Crude 'A' | 6.2 |
| "SBS" Polymer (STYRELF) Modified Asphalt Ex Crude 'A' | 6.5 |
| "EVA" Polymer Modified Asphalt Ex Crude 'A' | 6.8 |

TABLE 14

COMPARISON OF TOTAL LOAD CYCLES FOR 6.0 mm DEFORMATION

|  | Total No. of Load Cycles |
|---|---|
| Premium Asphalt Ex Crude 'A' | 2,800,000 |
| "SBS" Polymer (STYRELF) Modified Asphalt Ex Crude 'A' | 2,150,000 |
| "EVA" Polymer Modified Asphalt | 2,300,000 |

TABLE 14-continued

COMPARISON OF TOTAL LOAD CYCLES FOR 6.0 mm DEFORMATION

|  | Total No. of Load Cycles |
|---|---|
| Ex Crude 'A' |  |

The results set out in Tables 13 and 14 demonstrate the superior performance of the premium asphalt and show that it provides pavement performance equivalent to or better than the pavement performance of polymer modified asphalts. The premium asphalt provided a 23% improvement in load carrying capacity as compared to the "EVA" modified asphalt and a 30% improvement as compared to the STYRELF SBS modified asphalt.

EXAMPLE 4

In this Example premium asphalts were prepared from low quality paving asphalt precursors. The physical characteristics of three test asphalts are set out in Table 15. The three test asphalts are described briefly below:

(1) a conventional high quality asphalt ex crude 'A';
(2) a low quality asphalt ex crude 'B' which is prepared by conventional processes, and;
(3) a premium paving asphalt prepared according to the process of the present invention from the low quality asphalt precursor ex crude 'B'. The low quality asphalt precursor which was used to prepare a catalytically oxidized product had a viscosity of 420 cSt at 100° C. (ASTM D-2170). The oxidation was conducted at 450° F. using 0.3 wt. % dry $FeCl_3$ for about 5.5 hours to obtain a catalytically oxidized paving asphalt cement having a penetration of 20 (25° C., 100 g, 5 sec, ASTM D-5). This 20 pen catalytically oxidized paving asphalt cement was back mixed at a ratio of 34% catalytically oxidized material to 66% low quality paving asphalt precursor ex crude "B" having a penetration of 205 (100 g, 5 sec, 25° C.) and a viscosity of 865 cSt at 100° C. to produce an 85-100 pen premium asphalt cement ex crude "B". The final product had a penetration of 91 as shown in Table 15.

TABLE 15

| Characteristics | Method Reference | High Quality Asphalt Ex Crude 'A' | Low Quality Asphalt Ex Crude 'B' | Premium Asphalt Ex Crude 'B' |
|---|---|---|---|---|
| Viscosity, Poise 60° C. (140° F.) | ASTM D2171 | 1453 | 784 | 1620 |
| Viscosity, cSt, 135° C. (275° F.) | ASTM D2170 | 350 | 208 | 346 |
| Pen 25° C. (77° F.), 100 g, 5 sec | ASTM D5 | 91 | 92 | 91 |
| Pen 4° C. (39° F.), 200 g, 60 sec | ASTM D5 | 27 | 28 | 33 |
| Pen 4° C. (39° F.), 100 g, 5 sec | ASTM D5 | 7 | 8 | 10 |
| PVN |  | −0.53 | −1.30 | −0.5 |
| PI |  | −1.80 | −1.50 | −0.9 |

In order to demonstrate the superior performance of the premium asphalt product, both the premium asphalt ex crude 'B' and the high quality conventional asphalt ex crude 'A' were tested in the pavement performance simulator. The tests were carried out at room temperature as previously described in Example 1. The Marshall mix design parameters and the as constructed test data are set out in Table 16.

TABLE 16

MARSHALL MIX DESIGNS AND AS CONSTRUCTED TEST DATA

|  | Conventional High Quality Asphalt Ex Crude 'A' | Premium Asphalt Ex Low Quality Crude 'B' |
|---|---|---|
| Stability, N (lbs) | 12,700 (2857) | 13,970 (3143) |
| Flow, 0.25 mm | 11.0 | 11.8 |
| Voids, % | 4.0 | 3.80 |
| VMA, % | 16.3 | 16.5 |
| Subgrade Density, kg/m$^3$ (pcf) | 1858 (116) | 1842 (115) |
| % Moisture | 2.5 | 2.8 |
| Granular Base Density, kg/m$^3$ (pcf) | 2307 (144) | 2320 (145) |
| % Moisture | 3.5 | 3.6 |
| Thickness mm | 236 | 232 |
| Asphalt Test Slab (HL3) | | |
| Thickness mm | 80 | 82 |
| Specific Gravity | 2.172 | 2.183 |

The permanent deformation after 3,000,000 load cycles was determined and the total number of load cycles required to obtain a deformation of 6.0 mm was recorded. The results are set out in Table 17.

TABLE 17

| Asphalt Type | COMPARISON OF PAVEMENT RUTTING AFTER 3,000,000 LOAD CYCLES | | COMPARISON OF LOAD CARRYING CAPACITY TO 6.0 mm RUTTING |
|---|---|---|---|
| | Deformation, mm | % Reduction in Pavement Rutting | |
| Conventional High Quality Asphalt Ex Crude 'A' | 11.9 | — | 1,200,000 |
| Premium Asphalt Ex Low-Quality Crude 'B' | 3.6 | 70% | 10,000,000 |

The premium asphalt prepared from the low quality crude 'B' provided superior performance. This product demonstrated a reduction in pavement rutting of 70% and an increase of the pavement load carrying capacity of over 800% when compared to the performance of the high quality asphalt produced by conventional processes.

EXAMPLE 5

This Example demonstrates the superior temperature susceptibility of the asphalt prepared pursuant to the process of the instant invention. The asphalt used in this Example are briefly described below.

1. A high quality asphalt produced pursuant to conventional processes from crude 'A'.
2. A premium asphalt ex high quality crude 'A' prepared using the materials and methods described in Example 1.
3. A premium asphalt ex low quality crude 'B' prepared using the materials and methods described in Example 4.

Improved temperature susceptibility is demonstrated by improved values of PVN and PI. In addition, superior temperature susceptibility is also confirmed by pavement stiffness determinations carried out at −18° C. and by pavement resilient modulus tests (ASTM D-4123) carried out over a temperature range from 40° C. to 5° C. The results are set out in Table 18.

TABLE 18

|  | Conventional High Quality Asphalt Ex Crude 'A' | Premium Asphalt Ex High Quality Crude 'A' | Premium Asphalt Ex Low-Quality Crude 'B' |
|---|---|---|---|
| Pavement Resilient Modulus MR Psi × 10$^3$ | | | |
| 40° C. | 88 | 120 | 103 |
| 5° C. | 812 | 713 | 612 |
| Pavement Low-Temperature Stiffness, Psi × 10$^3$ (−18° C., 0.004 mm/min) | 919 | 460 | 592 |
| PVN | −0.7 | −0.1 | −0.5 |
| PI | −2.10 | −0.2 | −0.9 |

As is appreciated from the forgoing, by using the process of the present invention, it is possible to obtain an asphalt which has improved road performance characteristics. Such asphalts have a lesser amount of permanent deformation as measured by the pavement performance simulator. Premium asphalts of this invention demonstrate a permanent deformation reduction of up to 75% and, increased pavement load carrying capacity of up to 1000% or more. In addition they demonstrate improved temperature susceptibility and a 50% reduction in pavement low-temperature stiffness.

We claim:

1. A paving asphalt cement for use in preparing a paving asphalt exhibiting decreased rutting and increased traffic loading characteristics wherein the paving asphalt cement consists essentially of a blend of a first asphalt precursor which has been oxidized with a catalyst having a penetration value ranging from about 5 to 100 as measured by ASTM D5 at 25° C. and an unoxidized second asphalt precursor having a penetration value ranging from about 60 to 600 as measured by ASTM D5 at 25° C. in an amount such that the resulting paving asphalt cement has a penetration value ranging from about 40–400 as measured by ASTM D5 at 25° C.

2. The paving asphalt cement of claim 1 wherein said second asphalt precursor is present in said blend in an amount such that the resulting paving asphalt cement has a penetration value range selected from the group consisting of 40–50, 60–70, 85–100, 120–150, 150–200 and 200–300 as measured by ASTM D5 at 25° C.

3. The paving asphalt cement as claimed in claim 1 wherein each of the first asphalt precursor and the second asphalt precursor is a high quality paving asphalt precursor which meets the requirements of ASTM D3381-83e[1] Table 2.

4. The paving asphalt cement as claimed in claim 1 wherein each of the first asphalt precursor and said second asphalt precursor is individually selected from the group consisting of a low quality paving asphalt precursor which meets the requirements of ASTM D3381-83e1 Table 1, but not the requirements of Table 2, a non-paving asphalt precursor which does not meet the requirements of ASTM D3381-83e1 Tables 1 or 2 or a mixture thereof.

5. The paving asphalt cement as claimed in claim 1 wherein the first asphalt precursor is a non-paving asphalt precursor which does not meet the requirements of ASTM D3381-83e1 Tables 1 or 2.

6. The paving asphalt cement as claimed in claim 1 wherein the second asphalt precursor is a non-paving asphalt precursor which does not meet the requirements of ASTM D3381-83e1 Tables 1 or 2.

7. The paving asphalt cement as claimed in claim 1 wherein each of the first asphalt precursor and the second asphalt precursor is a non-paving asphalt precursor which does not meet the requirements of ASTM D3381-83e1 Tables 1 or 2.

8. The paving asphalt cement as claimed in claim 1 wherein each of the first asphalt precursor and the second asphalt precursor is individually selected from the group consisting of a non-paving asphalt precursor which does not meet the requirement of ASTM D3381-83e1 Tables 1 or 2, a low quality paving asphalt precursor which meets the requirements of ASTM D3381-83e1 Table 1, but not the requirements of Table 2, a high quality paving asphalt precursor which meets the requirements of ASTM D3381-83e1 Table 2 or a mixture of one or more of said precursors.

9. The paving asphalt cement as claimed in claim 1 wherein said catalyst is present in an amount ranging from 0.05 to 1 weight percent on a dry basis.

10. The paving asphalt cement as claimed in claim 1 wherein said catalyst is present in an amount ranging from 0.2 to 0.5 weight percent on a dry basis.

11. The paving asphalt cement as claimed in claim 1 wherein the catalyst is ferrous chloride, ferric chloride, phosphoric acid or phosphorous pentoxide.

12. The paving asphalt cement as claimed in claim 1 wherein said first asphalt precursor is oxidized for a time sufficient to provide a first asphalt cement having a penetration value ranging from about 15–40 as measured by ASTM D5 at 25° C.

13. A paving asphalt comprising an asphalt cement and an aggregate wherein the asphalt cement consists essentially of a blend of a catalytically oxidized first asphalt precursor and an unoxidized second asphalt precursor, the paving asphalt having at least a 20% reduction in paving rutting.

14. The paving asphalt as claimed in claim 13 wherein the first asphalt precursor is a non-paving asphalt precursor which does not meet the requirements of ASTM D3381-83e1 Tables 1 or 2.

15. The paving asphalt as claimed in claim 13 wherein the second asphalt precursor is a non-paving asphalt precursor which does not meet the requirements of ASTM D3381-83e1 Tables 1 or 2.

16. The paving asphalt as claimed in claim 13 wherein each of the first asphalt precursor and the second asphalt precursor is a non-paving asphalt precursor which does not meet the requirements of ASTM D3381-83e1 Tables 1 or 2.

17. The paving asphalt as claimed in claim 13 wherein each of the first asphalt precursor and the second asphalt precursor is individually selected from the group consisting of a non-paving asphalt precursor which does not meet the requirements of ASTM D3381-83e1 Tables 1 or 2, a low quality paving asphalt precursor which meets the requirements of ASTM D3381-83e1 Table 1, but not the requirements of Table 2, a high quality paving asphalt precursor which meets the requirements of ASTM D3381-83e1 Table 2 or a mixture of one or more of said precursors.

18. A process for preparing a paving asphalt cement for use in producing a paving asphalt mixture having an improved penetration-viscosity number and penetration index, said process comprising
   (a) catalytically oxidizing an asphalt precursor obtained from the distillation of crude oil and having a penetration value ranging from about 60 to about 600 as measured by ASTM D5 at 25° C. at a temperature ranging from about 205°–290° C. in the presence of a catalytically effective amount of a catalyst for a time sufficient to provide a first asphalt cement having a penetration value ranging from about 5 to about 100 as measured by ASTM D5 at 25° C. and
   (b) admixing said catalytically oxidized asphalt cement with an unoxidized asphalt precursor having a penetration value ranging from about 60 to 600 as measured by ASTM D5 in an amount sufficient such that the resulting paving asphalt cement has a penetration value ranging from about 40–400 as measured by ASTM D5 at 25° C.

19. The process as claimed in claim 18 wherein said asphalt precursor being oxidized in step (a) is a high quality paving asphalt precursor which meets the requirements of ASTM D3381-83e1 Table 2.

20. The process as claimed in claim 19 wherein said catalytically oxidized asphalt cement is admixed in step (b) with a high quality paving asphalt precursor which meets the requirements of ASTM D3381-83e1 Table 2.

21. The process as claimed in claim 18 wherein said asphalt precursor being oxidized in step (a) is a non-paving asphalt precursor which does not meet the requirements of ASTM D3381-83e1 Tables 1 or 2.

22. The process as claimed in claim 21 wherein said catalytically oxidized asphalt cement is admixed in step (b) with a non-paving asphalt precursor which does not meet the requirements of ASTM D3381-83e1 Tables 1 or 2.

23. The process as claimed in claim 18 wherein said asphalt material is oxidized for a time sufficient to provide a catalytically oxidized cement having a penetration value ranging from about 15–40 as measured by ASTM D5 at 25° C.

24. The process as claimed in claim 18 wherein said unoxidized asphalt precursor being admixed in step (b) with said catalytically oxidized asphalt cement is admixed in an amount such that the resulting paving asphalt cement has a penetration value selected from the group consisting of 40–50, 60–70, 85–100, 120–150, 150–200 and 200–300 as measured by ASTM D5 at 25° C.

25. The paving asphalt as claimed in claim 1 wherein said paving asphalt is substantially free of performance enhancers.

26. The paving asphalt as claimed in claim 1 wherein said paving asphalt is free of performance enhancers.

* * * * *